United States Patent
Amadi et al.

(10) Patent No.: US 11,210,877 B1
(45) Date of Patent: Dec. 28, 2021

(54) PASSIVE ENTRY PASSIVE START VERIFICATION WITH TWO-FACTOR AUTHENTICATION

(71) Applicant: Ford Global Technologies, LLC, Dearborn, MI (US)

(72) Inventors: Lawrence Chikeziri Amadi, Chicago, IL (US); Ali Hassani, Ann Arbor, MI (US); Walter Joseph Talamonti, Canton, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/109,956

(22) Filed: Dec. 2, 2020

(51) Int. Cl.
| | |
|---|---|
| *G07C 9/00* | (2020.01) |
| *G07C 9/22* | (2020.01) |
| *B60R 25/24* | (2013.01) |
| *B60R 25/20* | (2013.01) |

(52) U.S. Cl.
CPC ........ *G07C 9/00309* (2013.01); *B60R 25/209* (2013.01); *B60R 25/245* (2013.01); *B60R 25/246* (2013.01); *G07C 9/00658* (2013.01); *G07C 9/22* (2020.01); *B60R 2325/205* (2013.01); *G07C 2009/00515* (2013.01); *G07C 2009/00547* (2013.01); *G07C 2009/00769* (2013.01)

(58) Field of Classification Search
None
See application file for complete search history.

(56) References Cited

U.S. PATENT DOCUMENTS

| 9,707,911 B1 | 7/2017 | Myers et al. | |
|---|---|---|---|
| 2006/0082437 A1* | 4/2006 | Yuhara | B60R 25/04 340/5.82 |
| 2017/0193823 A1* | 7/2017 | Jiang | G08B 6/00 |
| 2018/0236972 A1 | 8/2018 | Linden et al. | |
| 2018/0354363 A1* | 12/2018 | Rolfes | B60K 28/12 |

FOREIGN PATENT DOCUMENTS

DE 102018202834 A1 10/2018

OTHER PUBLICATIONS

Saad Ezzini et al., "Who is Behind the Wheel? Driver Identification and Fingerprinting", Journal of Big Data, SpringerOpen.com, Feb. 27, 2018, 15 pages.

* cited by examiner

*Primary Examiner* — Carlos Garcia
(74) *Attorney, Agent, or Firm* — Frank Lollo; Eversheds Sutherland (US) LLP

(57) ABSTRACT

A method for a secure Passive Entry Passive Start (PEPS) authentication protocol measures the walking gait of a user approaching a related vehicle using a passive key device carried by the user. The method also includes measuring the user's gait from the perspective of the vehicle using a vehicle perception system to compare the two and validate the security of an unlock request, authenticate the unlocking session, and protect against relay attacks. The two-factor authentication protocol validates the physical presence and temporal state of the key fob or mobile phone relative to the vehicle using detected key gait measurement (key G-gait) and a vehicle perception-based gait (C-gait) measurement by comparing the independent gaits and generating control commands responsive to consistent and inconsistent measurements.

20 Claims, 4 Drawing Sheets

PASSIVE ENTRY PASSIVE START VERIFICATION WITH TWO-FACTOR AUTHENTICATION

BACKGROUND

The frequent theft of vehicles or the vehicle's content has become a growing global concern because of the potential by which such items can be stolen via relay attacks. Because of this growing security concern with passive access fobs, some regions have enacted laws that prohibit sale of vehicles that may be more susceptible to passive fob relay attacks. The auto industry has responded to this challenge by integrating secondary and backup authentication systems, such as biometrics and keypads, into vehicle passive access systems. However, some conventional solutions may not directly mitigate relay attacks. Rather, conventional passive systems add another layer of security, which may negate the hands-free passive feature which makes passive entry systems convenient for some users.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
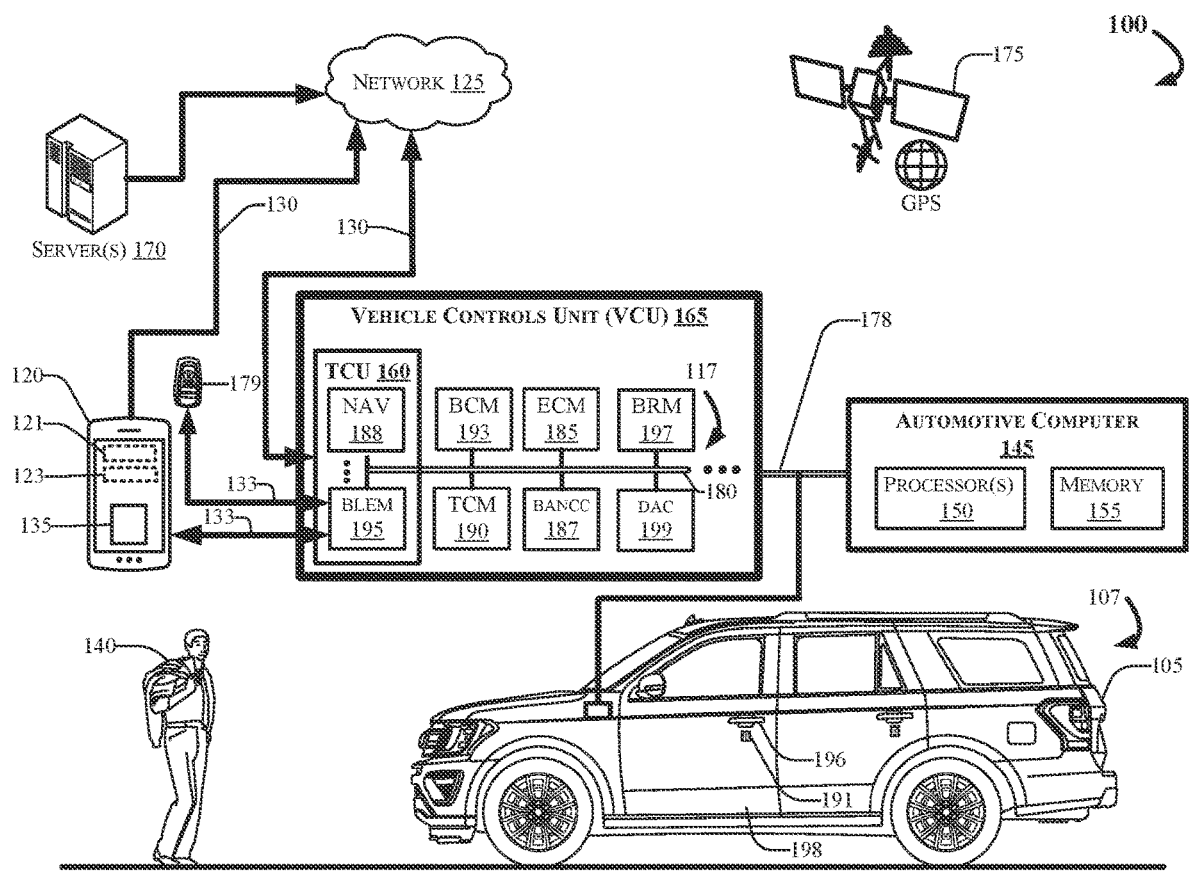
FIG. 1 depicts an example computing environment in which techniques and structures for providing the systems and methods disclosed herein may be implemented.

The disclosure is directed to a method involving a secure PEPS (Passive Entry Passive Start) authentication protocol that uses human gait to validate an unlocking session and protect against relay attacks. The method implements a two-way authentication protocol that validates the physical presence and temporal state of the key fob or mobile phone relative to the vehicle using detected key gait measurement (key G-gait) and a camera based vehicle perception-based gait (C-gait) measurement of the approaching user from the perspective of the vehicle.

The vehicle perception-based gait of the approaching user is extracted using image-based gait acquisition techniques such as the deep learning approach of deriving 3D Temporal Human Pose Estimation from 2D image sequences. An optical or infrared camera may be used to determine the C-gait. At the same time, or sequentially, the vehicle may estimate the gait of the person carrying the passive key device using an inertial measurement unit (IMU) onboard the passive key device(s). The IMU can include, in one embodiment, an accelerometer and gyroscope, among other possible devices. The passive key may output the key G-gait and send the key G-gait to the vehicle using a wireless communication protocol. The passive key device key G-gait signature and the vehicle perception C-gait signature are independently compared at the vehicle. Responsive to determining that the signatures match (within an acceptable similarity threshold), the unlock signal is authenticated, placing the vehicle in an authenticated state where an actuation or other touch of the door handle that the user is approaching (as determined by one or more sensors (e.g., a camera)) can trigger a vehicle unlock command.

Responsive to determining that the key G-gait and the C-gait do not match, the vehicle may send a notification to the mobile device or fob, and the unlock signal is ignored.

In one embodiment, to reduce key-off load, the automotive computing system can apply a confidence threshold to the key C-gait analysis. For example, if the key C-gait is a programed biometric key for a driver-side door passive entry, recognition of that key C-gate, within a predetermined threshold for error, may constitute a sufficient confidence score to allow the control system to issue the unlock command. On the other hand, if the confidence score is in an intermediary range, the control system may activate the vehicle perception system to perform a two-factor authentication comparison.

In another embodiment, the control system may perform an approach detection suspension method when a PEPS key is recognized within the detection zone, but the user does not intend to unlock the vehicle. When motion is detected by the PEPS key, the PEPS key may transmit a signal to the vehicle indicative of motion associated with the PEPS key, indicative of movement by the user. If the vehicle also senses activity within the detection zone, the vehicle may send a confirmation signal to the PEPS key, and C-gait tracking begins. If no response is received from the vehicle (because the vehicle is out of range or unable to sense activity), the PEPS key may enter into a low-energy mode for a predefined period to conserve passive key energy reserves. Similarly, if the vehicle senses motion in its immediate environment, the control system may send a query signal to the PEPS key and wait for a confirmation to initiate C-gait tracking.

Embodiments of the present disclosure may increase passive key vehicle entry security by mitigating any potential risk of theft due to relay attack, spoofing, and other wireless device attacks, while preserving the utility and convenience of passive key entry systems. These and other advantages of the present disclosure are provided in greater detail herein.

Illustrative Embodiments

The disclosure will be described more fully hereinafter with reference to the accompanying drawings, in which example embodiments of the disclosure are shown, and not intended to be limiting.

With relay attack related theft increasing for passive access vehicles, there is an immediate need to boost the security protocol for passive access systems to make them more robust in defending against relay attacks. A relay attack is a form of a middle-man attack where an agent is positioned in-between the communication path of a key (i.e., fob or phone) and a vehicle with the goal of making it appear as though the key is in the proper detection zone for a given PEPS function when in fact it is at some farther distance. The agent relays the normal radio frequency communications between the vehicle and key in a manner that disguises the agent, allowing the agent to be incorrectly identified as next to the vehicle with the valid vehicle key in lieu of the user.

In a full 2-way relay attack, the attack is made up of two devices often operated by two agents. One device is placed close to the vehicle key, and the other device is placed next to the vehicle. The agent near the vehicle will trigger the vehicle to initiate a one-way key authentication challenge to the vehicle key by, for example, pulling the door handle. The vehicle then sends radio frequencies that are captured by the device near the vehicle disguised as the key, which then forwards it to the second device with the accomplice agent who positions themselves in close proximity to the actual vehicle key, and then the second agents devices replays the commands from the vehicle to the nearby vehicle key (i.e., fob or phone). Because the device placed close to the vehicle key disguises itself as the vehicle, on receiving the authentication challenge request, the vehicle key responds by sending location information signals to the device (Received Signal Strength Indication "RSSI" data in the case of the fob or measuring RSSI values in the case of the phone), which is then transferred over to the vehicle, and access is granted.

With fobs, relay attacks can sometimes also be accomplished with only a 1-way amplification of the short-range low frequency challenge from the vehicle to the fob. Since most fobs have a long transmit range, the fob may be heard by the attacker without the need to relay the fob's challenge response. In phone systems using BLE, the bi-directional range is typically symmetrical.

The request-and-respond one-way authentication protocol makes the passive access fob or phone vulnerable to a middleman attack. For example, two bad actors working together can easily gain access to a vehicle or steal a vehicle from a public place without raising any suspicion. One of the bad actors tails a vehicle owner carrying a key fob as they walk on the street or around a mall, while the second bad actor with a transmitting and receiving device tricks the system and gains access into the vehicle. Notice that even with communication encryption the system remains vulnerable to relay attacks because the agents need only relay communication between the key fob and the vehicle without necessarily having to understand what is being communicated. Hence, a better authentication protocol is desired to validate every vehicle remote unlock or start request.

Most of the newly implemented features of conventional PEPS systems used to counter relay attacks require the user to perform an additional task. For example, users may have to touch a vehicle key (stationary in their pocket) twice while standing still, as an explicit indication that a valid user is intentionally requesting unlock access. Other implementations may require the vehicle key to exceed a threshold amount of motion monitored by an accelerometer in the device to wake-up the vehicle key's communication module. However, these solutions are not holistic, and force the user to perform additional actions, thereby, compromising the value of a passive entry feature. Secondly, solutions relying on motion detection alone may still be bypassed by the relay attack described above, where the person with the key is walking but being followed by a bad actor.

A vehicle perception authentication system is described in the following embodiments which may address these weaknesses of conventional systems by authenticating an unlock request using a two-factor process that includes gait detection and matching gait measurements from two independent perspectives. The vehicle perception authentication system may utilize a two-way authentication protocol that validates the physical presence and temporal state of the key fob or phone relative to the vehicle using detected key G-gait and the observed C-gait of the approaching user.

FIG. 1 depicts an example computing environment 100 that can include a vehicle 105 comprising an automotive computer 145, and a Vehicle Controls Unit (VCU) 165 that typically includes a plurality of electronic control units (ECUs) 117 disposed in communication with the automotive computer 145 and a vehicle perception authentication system 107. A mobile device 120, which may be associated with a user 140 and the vehicle 105, may connect with the automotive computer 145 using wired and/or wireless communication protocols and transceivers. The mobile device 120 may be communicatively coupled with the vehicle 105 via one or more network(s) 125, which may communicate via one or more wireless channel(s) 130, and/or may connect with the vehicle 105 directly using near field communication (NFC) protocols, Bluetooth® protocols, Wi-Fi, Ultra-Wide Band (UWB), and other possible data connection and sharing techniques.

Embodiments of the present disclosure describe passive key devices, that are not limited to key fobs, but rather can include the mobile device 120 configured and/or programmed to operate as a passive Phone-as-a-Key (PaaK) device, a smart watch, and/or other passive communication device.

The vehicle 105 may receive and/or be in communication with a Global Positioning System (GPS) 175. The GPS 175 may be a satellite system (as depicted in FIG. 1) such as the global navigation satellite system (GLNSS), Galileo, or navigation or other similar system. In other aspects, the GPS 175 may be a terrestrial-based navigation network, or any other type of positioning technology known in the art of wireless navigation assistance. Further, the Navigation function 188 may use dead reckoning to plan navigation routes when wireless signals from GPS and/or terrestrial-based navigation network are not accessible.

The automotive computer 145 may be or include an electronic vehicle controller, having one or more processor(s) 150 and memory 155. The automotive computer 145 may, in some example embodiments, be disposed in communication with the mobile device 120, a fob 179, and one or more server(s) 170. The server(s) 170 may be part of a cloud-based computing infrastructure and may be associated with and/or include a Telematics Service Delivery Network (SDN) that provides digital data services to the vehicle 105 and other vehicles that may be part of a vehicle fleet.

Although illustrated as a sport utility, the vehicle 105 may take the form of another passenger or commercial automobile such as, for example, a car, a truck, a crossover vehicle, a van, a minivan, a taxi, a bus, etc., and may be configured and/or programmed to include various types of automotive drive systems. Example drive systems can include various types of internal combustion engine (ICE) powertrains having a gasoline, diesel, or natural gas-powered combustion engine with conventional drive components such as, a transmission, a drive shaft, a differential, etc. In another configuration, the vehicle 105 may be configured as an electric vehicle (EV). More particularly, the vehicle 105 may include a battery EV (BEV) drive system or be configured as a hybrid EV (HEV) having an independent onboard powerplant, a plug-in HEV (PHEV) that includes a HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicle 105 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 105 may be a manually driven vehicle, and/or be configured and/or programmed to operate in a fully autonomous (e.g., driverless) mode (e.g., level-5 autonomy) or in one or more partial autonomy modes. Examples of partial autonomy modes are widely understood in the art as autonomy Levels 0 through 5. A vehicle having a Level-0 autonomous automation may not include any autonomous driving features. An autonomous vehicle (AV) having Level-1 autonomy may include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. Level-3 autonomy in a vehicle can provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 automation includes vehicles having high levels of autonomy that can operate independently from a human driver, but still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls.

According to embodiments of the present disclosure, the vehicle perception authentication system 107 may be configured and/or programmed to operate with a vehicle having a Level-0 though Level-5 autonomous vehicle controller. Accordingly, the vehicle perception authentication system 107 may provide some aspects of human control to the vehicle 105, including vehicle access, when the vehicle is configured as an AV.

The mobile device 120 generally includes a memory 123 for storing program instructions associated with an application 135 that, when executed by a mobile device processor 121, performs aspects of the disclosed embodiments. The application (or "app") 135 may be part of the vehicle perception authentication system 107 or may provide information to the vehicle perception authentication system 107 and/or receive information from the vehicle perception authentication system 107.

In some aspects, the mobile device 120 and/or fob 179 may communicate with the vehicle 105 through the one or more wireless connection(s) 133, which may be encrypted and established between the mobile device 120 and a Telematics Control Unit (TCU) 160. In some embodiments, the mobile device 120 may be configured and/or programmed to include a passive vehicle key operable as part of the vehicle perception authentication system 107. The mobile device 120 and/or fob 179 may communicate with the TCU 160 using a wireless transmitter associated with the TCU 160 on the vehicle 105.

In other embodiments, the transmitter may communicate with the mobile device 120 using a wireless communication network such as, for example, the one or more network(s) 125. The wireless channel(s) 130 are depicted in FIG. 1 as communicating via the one or more network(s) 125, and via one or more direct wireless connection(s) 133. The wireless connection(s) 133 may include various low-energy protocols including, for example, Bluetooth®, BLE, UWB, Near Field Communication (NFC), or other protocols.

The network(s) 125 illustrate an example of a communication infrastructure in which the connected devices discussed in various embodiments of this disclosure may communicate. The network(s) 125 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The automotive computer 145 may be installed in an engine compartment of the vehicle 105 (or elsewhere in the vehicle 105) and operate as a functional part of the vehicle perception authentication system 107, in accordance with the disclosure. The automotive computer 145 may include one or more processor(s) 150 and a computer-readable memory 155.

The one or more processor(s) 150 may be disposed in communication with one or more memory devices disposed in communication with the respective computing systems (e.g., the memory 155 and/or one or more external databases). The processor(s) 150 may utilize the memory 155 to store programs in code and/or to store data for performing aspects in accordance with the disclosure. The memory 155 may be a non-transitory computer-readable memory storing a vehicle perception authentication program code. The memory 155 can include any one or a combination of volatile memory elements (e.g., dynamic random-access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc).

The VCU 165 may share a power bus 178 among the automotive computer 145 and the vehicle 105 and may be configured and/or programmed to coordinate the data between vehicle 105 systems, connected servers (e.g., the server(s) 170), and other vehicles operating as part of a vehicle fleet. The VCU 165 can include or communicate with any combination of the ECUs 117, such as, for example, a Body Control Module (BCM) 193, an Engine Control Module (ECM) 185, a Transmission Control Module (TCM) 190, the TCU 160, a Body and Network Communication Controller (BANCC) 187, Driver Assist Controller (DAC) 199, etc. In some aspects, the VCU 165 may control aspects of the vehicle 105, and implement one or more instruction sets received from the application 135 operating on the mobile device 120, from one or more instruction sets received from the vehicle perception authentication system 107, and/or from instructions received from an AV controller.

The TCU 160 can be configured and/or programmed to provide vehicle connectivity to wireless computing systems onboard and offboard the vehicle 105, and may include a Navigation (NAV) receiver 188 for receiving and processing a GPS signal from the GPS 175, a Bluetooth® Low-Energy (BLE) Module (BLEM) 195, a Wi-Fi transceiver, an Ultra-Wide Band (UWB) transceiver, and/or other wireless transceivers that may be configurable for wireless communication between the vehicle 105 and other systems, computers, and modules. The TCU 160 may be disposed in communication with the ECUs 117 by way of a bus 180. In some aspects, the TCU 160 may retrieve data and send data as a node in a Controller Area Network (CAN) bus.

The BLEM 195 may establish wireless communication using Bluetooth® and Bluetooth Low-Energy® communication protocols in addition to UWB protocols by broadcasting and/or listening for broadcasts of small advertising packets and establishing connections with responsive devices that are configured according to embodiments described herein. For example, the BLEM 195 may include Generic Attribute Profile (GATT) device connectivity for client devices that respond to or initiate GATT commands and requests, and connect directly with the mobile device 120, and/or one or more keys (which may include, for example, the fob 179 and/or the mobile device 120, among other possible passive key devices).

The bus 180 may be configured as a Controller Area Network (CAN) bus organized with a multi-master serial bus standard for connecting two or more of the ECUs 117 as nodes using a message-based protocol that can be configured and/or programmed to allow the ECUs 117 to communicate with each other. The bus 180 may be or include a high speed CAN (which may have bit speeds up to 1 Mb/s on CAN, 12 Mb/s on CAN Flexible Data Rate (CAN FD)), and can include a low-speed or fault tolerant CAN (up to 125 Kbps), which may, in some configurations, use a linear bus configuration. In some aspects, the ECUs 117 may communicate with a host computer (e.g., the automotive computer 145, the vehicle perception authentication system 107, and/or the server(s) 170, etc.), and may also communicate with one another without the necessity of a host computer. The bus 178 may connect the ECUs 117 with the automotive computer 145 such that the automotive computer 145 may retrieve information from, send information to, and otherwise interact with the ECUs 117 to perform steps described according to embodiments of the present disclosure. The bus 180 may connect CAN bus nodes (e.g., the ECUs 117) to each other through a two-wire bus, which may be a twisted pair having a nominal characteristic impedance. The bus 180 may also be accomplished using other communication protocol solutions, such as Media Oriented Systems Transport (MOST) or Ethernet. In other aspects, the bus 180 may be a wireless intra-vehicle bus.

The VCU 165 may control various loads directly via the bus 180 communication or implement such control in conjunction with the BCM 193. The ECUs 117 described with respect to the VCU 165 are provided for example purposes only and are not intended to be limiting or exclusive. Control and/or communication with other control modules not shown in FIG. 1 is possible, and such control is contemplated.

In an example embodiment, the ECUs 117 may control aspects of vehicle operation and communication using inputs from human drivers, inputs from an autonomous vehicle controller, the vehicle perception authentication system 107, and/or via wireless signal inputs received via the wireless connection(s) 133 from other connected devices such as the mobile device 120, among others. The ECUs 117, when configured as nodes in the bus 180, may each include a central processing unit (CPU), a CAN controller, and/or a transceiver. For example, although the mobile device 120 is depicted in FIG. 1 as connecting to the vehicle 105 via the BLEM 195, it is possible and contemplated that the wireless connection(s) 133 may also or alternatively be established between the mobile device 120 and one or more of the ECUs 117 via the respective transceiver(s) associated with the module(s).

The BCM 193 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 193 may also operate as a gateway for bus and network interfaces to interact with remote ECUs.

The BCM 193 may coordinate any one or more functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 193 may be configured for vehicle energy management, exterior lighting control, wiper functionality, power window and door functionality, heating ventilation and air conditioning systems, and driver integration systems. In other aspects, the BCM 193 may control auxiliary equipment functionality, and/or be responsible for integration of such functionality.

In some aspects, the vehicle 105 may include one or more Door Access Panels (DAPs) GUI keypad displays disposed on exterior door surface(s) of vehicle door(s) 198, and connected with a DAP controller. In some aspects, the user 140 may have the option of entering a vehicle by typing in a personal identification number (PIN) on an interface associated with a vehicle. The user interface may be included as part of a Door Access Panel (DAP) 191 interface, a wireless keypad, mobile device, or other interface. The DAP system, which may be included as part of the BCM 193, the BANCC 187 or another of the ECUs 117, can include and/or connect with an interface with which a ride-hail passenger (or any other user such as the user 140) may input identification credentials and receive information from the system. In one aspect, the interface may be or include a DAP 191 disposed on a vehicle door 198 and can include an interface device from which the user can interact with the system by selecting their unique identifier from a list, and by entering personal identification numbers (PINs) and other non-personally identifying information. In some embodiments, the interface may be a mobile device, a keypad, a wireless or wired input device, a vehicle infotainment system, and/or the like. Accordingly, it should be appreciated that, although a DAP is described with respect to embodiments disclosed herein, the interface may alternatively be one or more other types of interfaces described above and should not be considered limiting.

Figure 3:
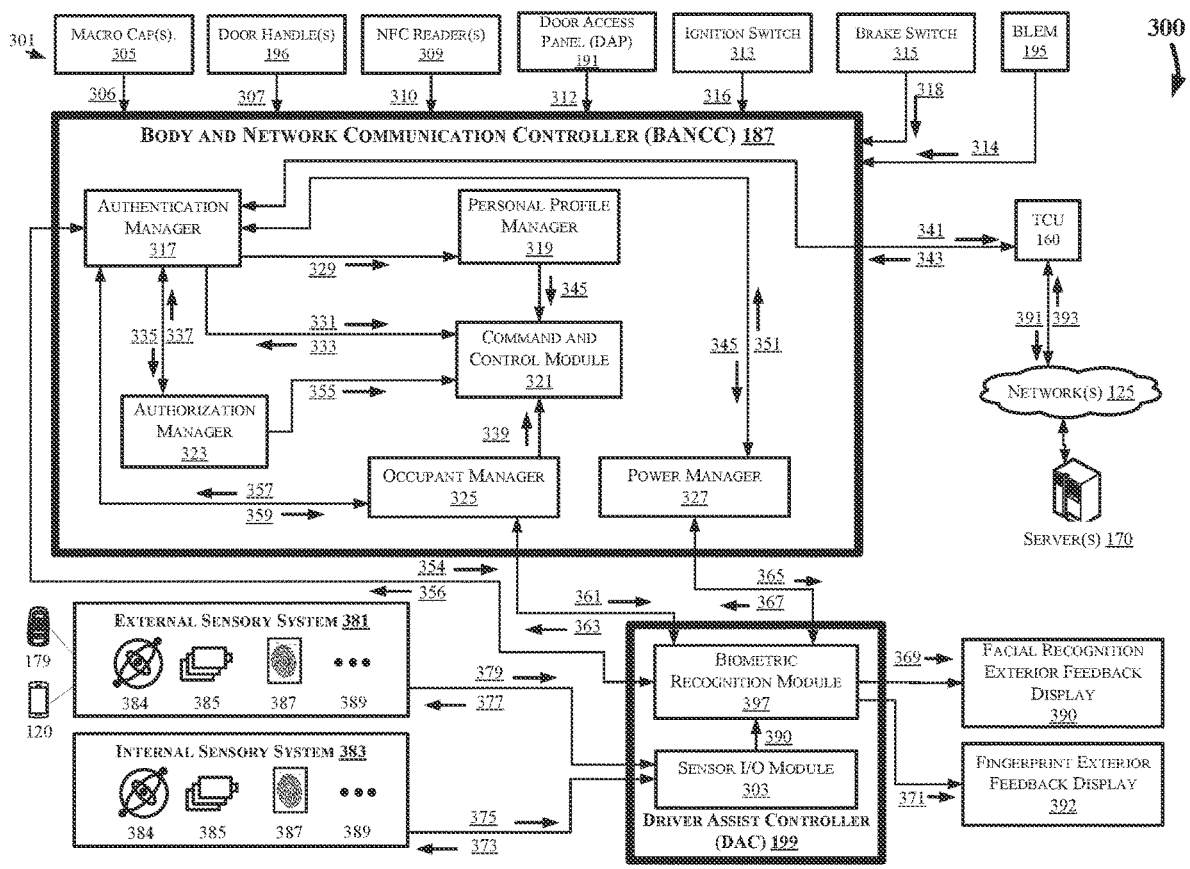
FIG. 3 illustrates a functional schematic of a biometric authentication and occupant monitoring system, in accordance with the present disclosure.

The BANCC 187, described in greater detail with respect to FIG. 3, can be a separate ECU 117 or its functionality may be incorporated into the BCM 193 or one or more of the other ECUs and can include sensory and processor functionality and hardware to facilitate user and device authentication, and provide occupant customizations and support that provide customized experiences for vehicle occupants.

The BANCC 187 may connect with a Driver Assist Technologies (DAT) controller 199 configured and/or programmed to provide biometric authentication controls, including, for example, facial recognition, fingerprint recognition, voice recognition, and/or other information associated with characterization, identification, and/or verification for other human factors such as gait recognition, body heat signatures, eye tracking, etc. The VCU 165 may, in some example embodiments, utilize the DAT controller 199 to obtain sensor information from sensors disposed on the vehicle interior and/or vehicle exterior. Exterior sensors may also be on adjacent vehicles or structures and wirelessly connected to the VCU 165 to allow a greater number of image vantage points when collecting the C-gait of users. The DAT controller 199 may characterize the sensor information for identification of biometric markers obtained from the sensor information. The DAT controller 199 may compare the sensor information with data stored in a secure biometric data vault onboard the vehicle 105 and/or via the server(s) 170. In other aspects, the DAT controller 199 may also be configured and/or programmed to control Level-1 and/or Level-2 autonomic driver assistance.

A vehicle PaaK system determines and monitors a predetermined communication range (referred to herein as a detection zone) for presence of a PaaK-enabled mobile device. In one embodiment, the vehicle PaaK system may broadcast a pre-authentication message to any passive key device present within the detection zone. As the mobile device approaches a predetermined communication range relative to the vehicle position, the mobile device may transmit a preliminary response message to the PaaK system. The PaaK system may cache the preliminary response message until a user associated with the authenticating device performs an unlock action such as actuating a vehicle door latch/unlatch mechanism by pulling a door handle or touching an unlock/unlatch switch, for example. The PaaK system may unlock the door using data already sent to the pre-processor to perform a first level authentication without the delay associated with the full range of authentication steps.

The processor(s) 150 may provide initial access to the vehicle 105 when the passive key device (e.g., the mobile device 120 and/or the fob 179) is within the detection zone. Determining that the passive key device is proximate to the vehicle 105 and within the detection zone, in conjunction with one or more other triggers, may cause pre-authorization steps to begin. For example, the processor(s) 150 may generate a secure processor initialization instruction responsive to a door latch opening, or a user touching the sensory area of a door handle or keyless entry keypad, or presence detection through cameras or other electromagnetic sensing. The processor(s) 150 may receive a sensor output that indicates an attempt to enter the vehicle.

The handle touch, by itself, does not trigger an unlock instruction. Rather, in an example embodiment, the touch to the door handle 196, plus the authenticated proximity indication associated with the position of the mobile device 120 or key fob 179 with respect to the vehicle 105, may cause a door handle sensor to transmit sensor output to the processor(s) 150. The processor(s) 150 may receive the vehicle sensor output associated with the actuation of the door handle 196 (and more precisely, associated with an actuation of a door latch mechanism of the door handle 196), and generate a secure processor initialization instruction to the processor(s) 150 in response.

The processor(s) 150 may also provide access to the vehicle 105 in conjunction with the PaaK system by unlocking the vehicle door 198, based on the authenticated key-on request and/or the authentication message (key-on request and authentication message) stored in the cache memory of the automotive computer 145. The secure processor initialization instruction may initialize the processor(s) 150, by sending instructions that "wake up" the processor(s) 150 by changing a power mode profile from a low-energy state to a higher-energy state.

The computing system architecture of the automotive computer 145, VCU 165, and/or the vehicle perception authentication system 107 may omit certain computing modules. It should be readily understood that the computing environment depicted in FIG. 1 is an example of a possible implementation according to the present disclosure, and thus, it should not be considered limiting or exclusive.

Figure 2:
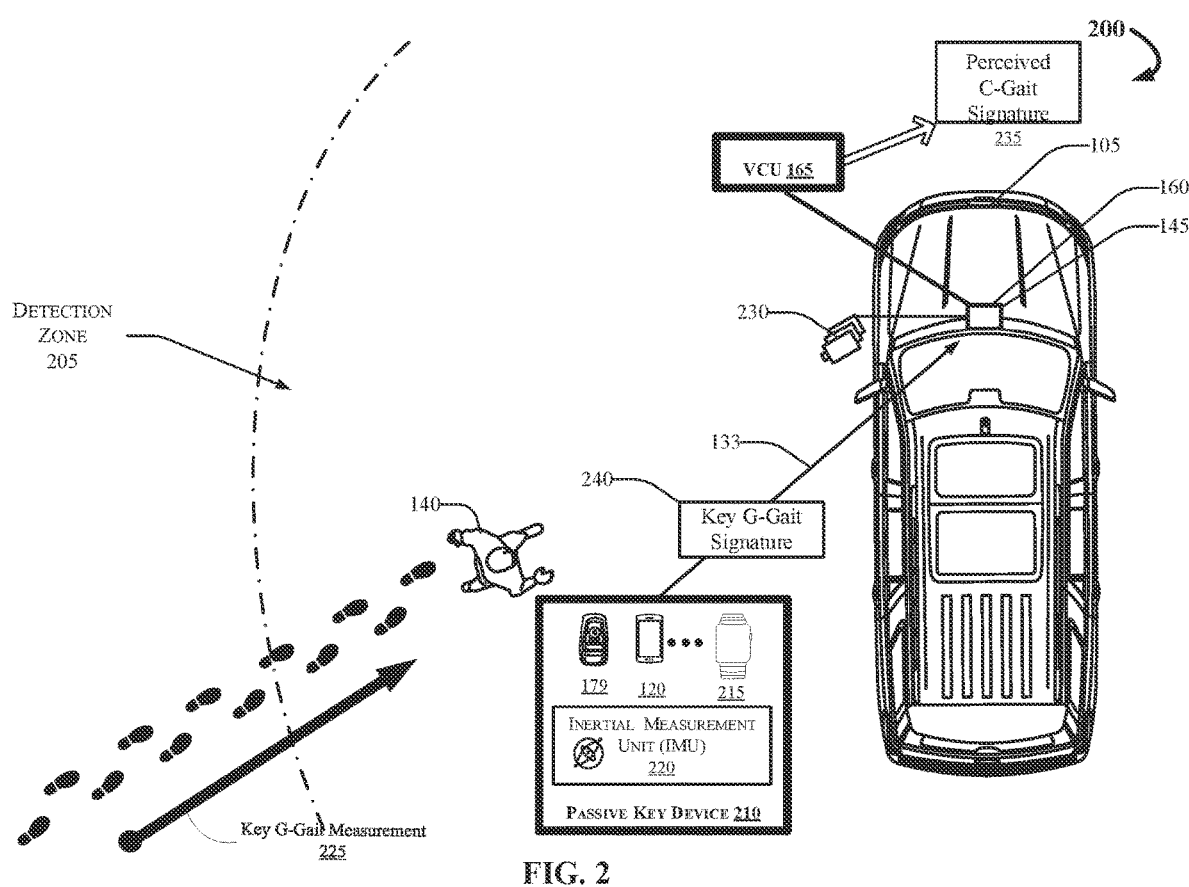
FIG. 2 depicts an example embodiment where the user approaches the vehicle 105 while in possession of a passive key device.

FIG. 2 depicts an example operating environment 200, where the user 140 approaches the vehicle 105 while in possession of a passive key device 210 (e.g., one or more of the mobile device 120, the fob 179, a smart watch 215, etc.), in accordance with an example embodiment.

As described with respect to FIG. 1, the vehicle perception authentication system 107 may perform an anti-relay attack verification process by comparing the characteristics of the approaching expected user 140 using two independent signal verifications that include a key G-gait measurement received from a passive key IMU 220, and a vehicle C-gait signature acquired from the perspective of the vehicle 105 using a vehicle perception system 230, described in greater detail with respect to FIG. 3. According to embodiments described herein, the pace of travel for the user as she/he approaches the vehicle 105 is described generally as the user gait (or G-gait), which may be characterized as a vector (for example, 3-Axis linear acceleration with respect to time). The passive key device 210 may perform the key G-gait measurement 225 using the IMU 220. After the passive key device 210 performs the key G-gait measurement 225 and outputs a key G-gait vector encoding 240, the passive key device 210 may send the key G-gait vector 240 to the VCU 165 by broadcasting the key G-gait vector 240 on a broadcast channel receivable by the vehicle 105. The message need not be encrypted and sent on a secure channel, because the vehicle 105 may perform an independent C-gait measurement using the vehicle perception system 230 and compare the vehicle perception result (a perceived C-gait signature 235) with the key G-gait signature. The Passive key device 210 may perform the key G-gait measurement 225 calculation in parallel with the similar measurement performed from the perspective of the vehicle 105 whenever a passive entry challenge is performed, in parallel at the onset of approach detection (where the vehicle 105 determines the presence of a passive key device 210 in the detection zone 205), or sequentially after a verification of the key G-gait signature 240, which may facilitate a reduced vehicle key-off load.

To calculate the IMU-based key G-gait measurement 225, the passive key device 210 may run a low-energy motion detector associated with the IMU 220, which may wakeup a full-motion sensing module, including the IMU 220, when significant motion is detected at the passive key device 210. Alternatively, a low energy touch or pressure sensor may be used to trigger the IMU 220. Responsive to receiving a localization challenge message via the passive key device 210, the passive key device 210 may transmit a response that can include the key G-gait vector 240. Using the key G-gait vector 240, the VCU 165 may attempt to characterize a type of motion associated with the key G-gait vector 240 from a context-based model that incorporates various modalities that can include: walking, running, slow pacing or strolling, travel using a personal mobility device such as a wheelchair, a walker, or other similar device, etc., In one embodiment, the context-based model may further include characterizations associated with clothing options for the user 140, such as shoe variety, baggy clothing vs. tight-fitting clothing, winter wear, etc.

In one example embodiment, the passive key device 210 may utilize two independent micro-controllers for an added security measure, where a first microcontroller controls the motion detection module of the passive key device 210, while a second microcontroller controls the RSSI communications at the passive key device 210.

In another aspect, in order to preserve key fob or phone battery life, the passive key device 210 may collect motion data and transmit the motion data to the vehicle 105 via the wireless connection(s) 133 (described with respect to FIG. 1) for processing.

In yet another embodiment, the server(s) 170 (described with respect to FIG. 1) may collect inertia data from the passive key device 210 and perform a similar analysis to generate the key G-gait signature 240 remotely (e.g., in the cloud), then forward the key G-gait signature 240 to the VCU 165.

The VCU 165 may extract the perceived C-gait signature 235 that estimates the gait of the approaching user 140 using an image-based gait acquisition technique, such as a deep learning approach for deriving 3D Temporal Human Pose Estimations from two-dimensional (2-D) image sequences. Although outside the scope of the present disclosure, those skilled in the art of 2-D image sequencing understand that such techniques may be performed either at the vehicle 105 by the VCU 165, or via the server(s) 170 (as shown in FIG. 1).

At the same time, or responsive to receiving the key G-gait signature 240, the VCU 165 may independently estimate the perceived C-gait signature 235 using the vehicle perception system 230. The VCU 165 may compare both the independently estimated key G-gait signature 240 and the independently perceived C-gait signature 235 to determine whether the two measurements match within a threshold range of error when compared. In one example, a threshold range of values may include an error rate (or percentage of difference) of 10% or less. Other values of acceptable error are possible, and such possibilities are contemplated.

Responsive to determining that the signatures match within an acceptable threshold of error, the VCU 165 may authenticate an unlock session. Responsive to determining that the C-gait signature does not match the key G-gait signature within the acceptable range of error, the VCU may conclude that the session is characterized as suspicious, and the vehicle will not process an unlock command In another example embodiment, the VCU may determine that the similarity measure between the encoded C-gait vector and G-gait vector is outside the acceptable range and generate a command for a status notification action to notify the passive key device 210 (and by extension, the user 140) that the session is not yet authenticated. Dissimilarity may be measured using any known technique, for example, a mean-squared-error or a probability prediction using a neural network. In order to keep the user 140 informed of the status of the authentication process, the vehicle 105 may send an alert to the passive key device 210, sound a horn or flash a vehicle light responsive to an authentication failure, and before a retry. The VCU 165 may also, or alternatively, send a notification command for a visual, haptic, or sound notification output on the passive key device 210. The command for the status notification action can configure the passive key device 210 for generating a notification indicative that the vehicle access signal is not authenticated. In other aspects, the command may also be sent to the passive key device 210, and/or to one or more vehicle systems, to indicate active gait tracking, failed gait tracking, and/or successful authentication.

There are use cases where the VCU 165 may recognize the passive key device 210 within the detection zone 205, but the user 140 may not intend to unlock the vehicle. For example, if the vehicle 105 is parked next to a restaurant inside of which the user 140 has stopped for dinner, the vehicle 105 may be parked in a lot close enough to the dining room where the passive key device 210 is perceivable by the VCU 165. In the present example, if the passive key device 210 remains static in the detection zone 205 (that is, without motion indicating that the user 140 is not moving) for a predetermined duration of time (e.g., 2.5 minutes, 5 minutes, 10 minutes, etc.) the authentication steps described herein may be suspended until the next key cycle (e.g., when the user 140 completes his/her meal and returns to the vehicle 105, unlocks the vehicle using conventional methods, and starts the vehicle 105). This can be problematic for scenarios where the wake-up of the gait recognition algorithm cannot be provided, such that the approaching gait will not be captured by either the key IMU or the vehicle perception system.

According to one embodiment, the VCU 165 may detect the passive key device 210 in motion. In another aspect, the passive key device 210 may detect the motion using the IMU 220 and send a status message to the vehicle 105 to confirm motion associated with the passive key device 210. If the vehicle 105 senses activity within the detection zone 205, the VCU 165 may send a confirmation signal to the passive key device 210 to signal the device to begin gait tracking, which can include performing the key G-gait measurement 225. If the passive key device 210 does not receive a confirmation message from the vehicle 105 (because vehicle is out of range or unable to sense activity), the passive key device 210 may enter into a low-energy mode (e.g., sleep) for a predefined period. Similarly, if the vehicle 105 senses motion in the detection zone 205, the VCU 165 may send a query signal to the passive key device 210 and wait for a confirmation from the device to initiate gait tracking.

Once gait tracking is in effect and the unlock session is successfully authenticated, the vehicle access state changes from "locked" to "authenticated." However, the vehicle 105 is not unlocked until the authenticated user 140 expresses access intent (by grabbing the door handle for instance) or entering the welcome zone in the case of Walk-Up Unlocking (WUU). When in "authenticated" mode, G-gait and C-gait tracking is maintained to continuously monitor the authenticated user 140. In one aspect, the vehicle 105 may reset to a locked state if both the key G-gait signature 240 and the perceived C-gait signature 235 no longer match. If for any reason C-gait tracking is lost, the VCU 165 may determine that the key G-gait signature 240 alone may be tracked for a limited time for changes in gait pattern. Lock mode is affected if the key G-gait deviates significantly from a prior "pre-detected" state. This solution capitalizes on the fact that the user 140 must always approach the vehicle 105 in order to enter it.

In some instances, the vehicle may include one or more open access points to the interior of the vehicle. For example, the vehicle may be a convertible or the like. In some instances, the vehicle may include one or more removable doors, panels, roofs, etc. In such instances, a second person could be waiting in the vehicle. Thus, in some instances, a secondary camera, such as an interior camera, could be used to confirm C-gait upon approach and the image of any persons in the vehicle at that point in time and shortly thereafter.

FIG. 3 illustrates a functional schematic of a biometric authentication and occupant monitoring system 300 that may provide vehicle entry and signal authentication using biometric information and other human factors, in accordance with the present disclosure. The biometric authentication and occupant monitoring system 300 may also provide user support and customization for the vehicle 105. The system may authenticate passive device signals from a PEPS-configured mobile device such as the mobile device 120, or another passive key device such as the fob 179, the smart watch 215 (as shown in FIG. 2), etc., and provide vehicle entry and signal authentication using biometric information and other human factors. The biometric authentication and occupant monitoring system 300 may also provide user support and customizations to enhance user experiences with the vehicle 105.

The biometric authentication and occupant monitoring system 300 can include the BANCC 187, which may communicate with the DAT controller 199, the TCU 160, the BLEM 195, and a plurality of other vehicle controllers 301. The BANCC 187 may also include a plurality of other vehicle sensors, input devices, and mechanisms 301, including one or more macro capacitor(s) 305 that may send vehicle wakeup data 306, the door handle(s) 196 that may send PEPS wakeup data 307, NFC reader(s) 309 that may send information such as NFC wakeup data 310, the DAPs 191 that may send information including DAP wakeup data 312, an ignition switch 313 that can send an ignition switch actuation signal 316, among other signals and notifications, and/or a brake switch 315 that may send a brake switch confirmation signal 318, among other possible signals. Other vehicle controllers 301 may further include components and systems not described with respect to FIG. 3, and additional controllers are possible and contemplated.

The DAT controller 199 may include and/or connect with a biometric recognition module 397 disposed in communication with the DAT controller 199 via a sensor Input/Output (I/O) module. The BANCC 187 provides biometric authentication controls, including, for example, facial recognition, fingerprint recognition, voice recognition, and/or other information associated with characterization, identification, and/or verification for other human factors such as gait recognition, body heat signatures, eye tracking, etc.

The DAT controller 199 may also be configured and/or programmed to provide biometric authentication control for the vehicle 105, including facial recognition, fingerprint recognition, voice recognition, and/or other authenticating information associated with the characterization and identification of users such as, for example, occupant appearance, occupant status, etc. The DAT controller 199 may also provide verification for other human factors such as gait recognition, body heat signatures, eye tracking, etc. The DAT controller 199 may obtain the sensor information from an external sensory system 381, which may include sensors disposed on the vehicle exterior and in devices connectable with the vehicle 105 such as the mobile device 120 and/or the fob 179. For example, the DAT controller 199 may measure, via an approach vector of the user 140, and determine, using the approach vector, the C-gait signature associated with the user's approach. The DAT controller 199 may further determine a receipt time for C-gait acquisition, and a coordinate approximation for the user at a point in time. The DAT controller 199 may measure —C-gait using the coordinate approximation and a time difference from the receipt time and the time of calculation of the coordinate approximation.

The DAT controller 199 may further connect with an internal sensory system 383, which may include any number of sensors configured in the vehicle interior (e.g., the vehicle cabin, which is not depicted in FIG. 3). The external sensory system 381 and internal sensory system 383 can connect with and/or include one or more inertial measurement units (IMUs) 384, which may include, for example, the IMU 220 depicted with respect to FIG. 2. The external sensory system 381 may further include one or more camera sensor(s) 385, fingerprint sensor(s) 387, and/or other sensor(s) 389, which may be part of the vehicle sensory system 230 as shown in FIG. 2 and obtain biometric data usable for characterization of the sensor information. The DAT controller 199 may utilize the sensor information to identify biometric markers by comparing the sensor data to information stored in a secure biometric data vault onboard the vehicle 105.

The DAT controller 199 may obtain, from the internal and external sensory systems 383 and 381, sensor data that can include sensory data 379 and internal sensor response signal(s) 375 via the sensor I/O module 303. The DAT controller 199 (and more particularly, the biometric recognition module 397) may characterize the sensor data 379 and 375, and generate occupant appearance and status information, which may be used by the BANCC 187 according to described embodiments.

In one example embodiment, the DAT controller 199 may include a pose estimation model trained specifically on images of persons wearing occluding clothing such as coats and dresses. Current human pose estimation models, such as OpenPose® and VideoPose3D®, are trained on well annotated images of persons with visibly outlined limbs. Examples of such curated datasets are the COCO® and Human 3.6M Dataset®, with ground-truth labels of human joints. Hence, human pose estimation models trained on these datasets may not perform well on images depicting subjects with occluded limbs in the image frames. In one aspect, a semi-supervised machine learning model may be used to jointly train a Convolutional Neural Network (CNN) on well-labelled data and unlabeled limb occluded data. This method takes advantage of well curated and publicly available datasets to train a pose estimation model that is more robust to limb occlusions. Other machine learning techniques are possible, and such methods are also contemplated.

The internal and external sensory systems 383 and 381 may provide the sensory data 379 responsive to an internal sensor request message 373 and an external sensor request message 377, respectively. The sensory data 379 and 375 may include information from any of the sensors 384-389, where the external sensor request message 377 and/or the internal sensor request message 373 can include a sensor modality with which the respective sensor system(s) are able to obtain the sensory data. The sensor modalities may include, for example, the camera sensor(s) 385, the IMU(s) 384, the fingerprint sensor(s) 387, and/or the other sensor(s) 389.

The camera sensor(s) 385 may include thermal cameras, optical cameras, and/or hybrid cameras having optical, thermal, or other sensing capabilities. Thermal cameras may provide thermal information of objects within a frame of view of the camera(s), including, for example, a heat map figure of a subject in the camera frame. An optical camera may provide color and/or black-and-white image data of the target(s) within the camera frame. For example, in certain conditions, the vehicle perception system 230 may struggle to calculate the perceived C-gait 235 of the approaching user. Examples may include poor lighting and the user wearing baggy clothing. In these conditions the vehicle may opt to also utilize imaging technologies that receive emitted energy (i.e. thermal vision) and apply adaptive learning methods to the gait characterization. The camera sensor(s) 385 may further include static imaging, or provide a series of sampled data (e.g., a camera feed) to the biometric recognition module 397.

The IMU(s) 384 may include a gyroscope, an accelerometer, a magnetometer, or other inertial measurement devices. The fingerprint sensor(s) 387 can include any number of sensor devices configured and/or programmed to obtain fingerprint information. The fingerprint sensor(s) 387 and/or the IMU(s) 384 may also be integrated with and/or communicate with a passive key device, such as, for example, the mobile device 120 and/or the fob 179. The fingerprint sensor(s) 387 and/or the IMU(s) 384 may also (or alternatively) be disposed on a vehicle exterior space such as the cabin roof, door panel, etc. In other aspects, when included with the internal sensory system 383, the IMU(s) 384 may be integrated in one or more modules disposed within the vehicle cabin or on another vehicle interior surface.

The biometric recognition module 397 may be disposed in communication with one or more facial recognition exterior feedback displays 390, which can operate as a user interface accessible to the user 140 outside of the vehicle 105 to provide facial recognition feedback information 369 associated with facial recognition processes described herein. The biometric recognition module 397 may further connect with one or more fingerprint exterior feedback displays 392, that may perform similar communication functions associated with fingerprint recognition processes described herein. Such similar functions may include providing fingerprint authentication feedback information 371 to the fingerprint exterior feedback displays 392, which may be accessible to the user 140 outside of the vehicle 105. It should be appreciated that the feedback displays 390 and/or 392 may be and/or include a portable or stationary I/O or other display disposed on the vehicle, the mobile device 120, the fob 179, and/or some other wired or wireless device.

The BANCC 187 can include an authentication manager 317, a personal profile manager 319, a command and control module 321, an occupant manager 325, an authorization manager 323 and a power manager 327, among other control components.

The authentication manager 317 may communicate biometric key information 354 to the DAT controller 199. The biometric key information can include biometric mode updates indicative of a particular modality with which the internal and/or external sensory systems 383 and 381 are to obtain sensory data. The biometric key information 354 may further include an acknowledgement of communication received from the biometric recognition module 197, an authentication status update including, for example, biometric indices associated with user biometric data, secured channel information, biometric location information, and/or other information. In some aspects, the authentication manager 317 may receive biometric key administration requests 356 and other responsive messages from the biometric recognition module 397, which can include, biometric mode message responses and/or other acknowledgements.

The authentication manager 317 may also connect with the authorization manager 323 to send authentication notifications 335 indicative of users that may or may not be authenticated to enter or use the vehicle 105 systems. The authorization manager may provide unique authorization information and include updates to the authentication manager for keeping track of users and/or devices that may and may not access the vehicle, and/or use vehicle systems. The authentication manger 317 may also receive acknowledgements 337 from the authorization manager 323 responsive to the authentication notifications 335.

The authentication manager 317 may further connect with the TCU 160 and communicate biometric status payload information 341 to the TCU 160. The biometric status payload information 341 may be indicative of the biometric authentication status of the user 140, requests for key information, profile data, and other information. The TCU 160 may send and/or forward digital key payload 391 to the server(s) 170 via the network(s) 125 and receive digital key status payload 393 from the server(s) 170 to provide responsive messages and/or commands to the authentication manager 317 that can include biometric information payload 343.

Moreover, the authentication manager 317 may be disposed in communication with the BLEM 195, and/or the other vehicle controllers 301 according to embodiments described in the present disclosure. For example, the BLEM 195 may send a PaaK wakeup message 314, or another initiating signal indicating that one or more components should transition from a low-power mode to a higher-power mode (or ready) mode.

The authentication manager 317 may also connect with the personal profile manager 319, and the power manager 327. The personal profile manager 319 may perform data management associated with user profiles, which may be stored in the automotive computer 145 and/or stored on the server(s) 170. For example, the authentication manager 317 may send occupant seat position information 329 to the personal profile manager 319, which may include a seat position index indicative of preferred and/or assigned seating for passengers of the vehicle 105. The personal profile manager 319 may update seating indices, delete and create profiles, and perform other administrative duties associated with individualized user profile management.

The power manager 327 may receive power control commands from the authentication manager 317, where the power control commands are associated with biometric authentication device management including, for example, device wakeup causing the biometric recognition module 397 and/or the DAC 199 to transition from a low power (e.g. standby mode) state to a higher power (e.g., active mode) state. The power manager 327 may send power control acknowledgements 351 to the authentication manager 317 responsive to the control commands 345. For example, responsive to the power control commands 345 received from the authentication manager 317, the power manager 327 may generate a power control signal 365 and send the power control signal to the biometric recognition module. The power control signal 365 may cause the biometric recognition module to change power states (e.g., wakeup, etc.). The biometric recognition module may send a power control signal response 367 to the power manager 327 indicative of completion of the power control signal 365.

The authentication manager 317 and/or the personal profile manager 319 may further connect with the command and control module 321, which may be configured and/or programmed to manage user permission levels, and control vehicle access interface(s) for interfacing with vehicle users. The command and control module 321 may be and/or include, for example, the BCM 193 described with respect to FIG. 1. In another example embodiment, the authentication manager 317 may send command and control authentication information 331 that causes the command and control module 321 to actuate one or more devices according to successful or unsuccessful authentication of a device, a signal, a user, etc. The command and control module 321 may send acknowledgements and other information including, for example, vehicle lock status 333 to the authentication manager 317.

The occupant manager 325 may connect with the authentication manager 317, and communicate occupant change information 357 indicative of occupant changes in the vehicle 105. For example, when occupants enter and exit the vehicle 105, the occupant manager 325 may update an occupant index and transmit the occupant index as part of the occupant change information 357 to the authentication manager. The occupant manager 325 may also receive seat indices 359 from the authentication manager 317, which may index seating arrangements, positions, preferences, and other information.

The occupant manager 325 may also connect with the command and control module 321. The command and control module 321 may receive adaptive vehicle control information 339 from the occupant manager 325, which may communicate and/or include settings for vehicle media settings, seat control information, occupant device identifiers, and other information.

The occupant manager 325 may be disposed in communication with the DAT controller 199 and may communicate biometric mode update information 361 to the biometric recognition module 397, which may include instructions and commands for utilizing particular modalities of biometric data collection from the internal sensory system 383 and/or the external sensory system 381. The occupant manager 325 may further receive occupant status update information and/or occupant appearance update information (collectively shown as information 363 in FIG. 3) from the biometric recognition module 397.

Figure 4:
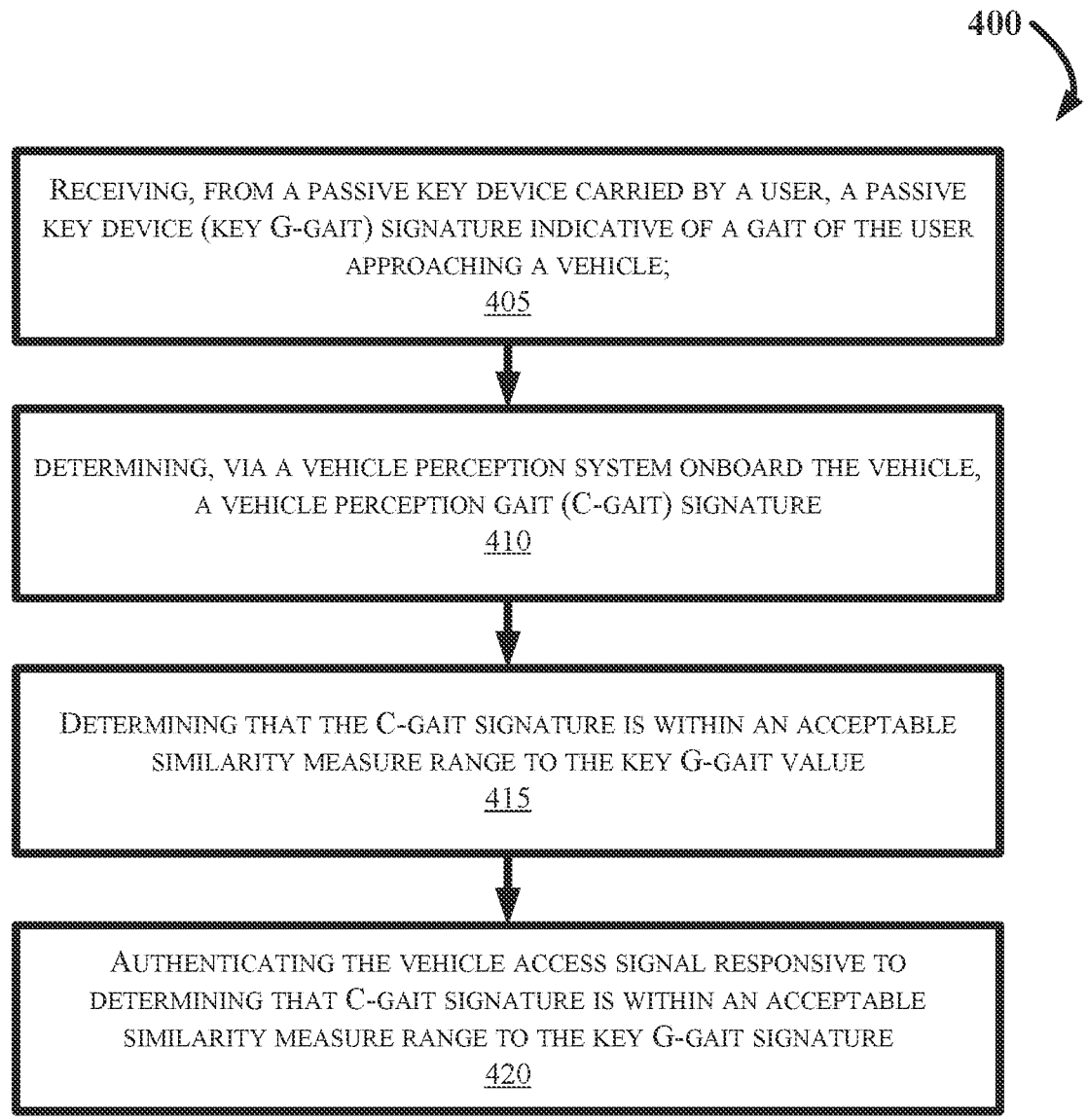
FIG. 4 depicts a flow diagram in accordance with the present disclosure.

FIG. 4 is a flow diagram of an example method 400 for authenticating a vehicle access signal using two independent signal verifications, according to the present disclosure. FIG. 4 may be described with continued reference to the prior figures, including FIGS. 1-3. The following process is exemplary and not confined to the steps described hereafter. Moreover, alternative embodiments may include more or less steps than are shown or described herein and may include these steps in a different order than the order described in the following example embodiments.

Referring to FIG. 4, at step 405, the method 400 may commence with receiving, from a passive key device carried by a user, a passive key device (key G-gait) motion vector indicative of a gait of the user approaching a vehicle.

At step 410, the method 400 may further include determining, via a vehicle perception system onboard the vehicle, a vehicle perception gait (C-gait) motion vector. This may be accomplished by measuring, via a vehicle perception system, an approach vector of the user perceived from exterior facing vehicle cameras and a receipt time (up to milliseconds resolution) for the C-gait derived approach vectors, and a coordinate approximation for the user. This step may include determining the coordinate approximation by characterizing a motion type associated with the user approaching the vehicle and determining the coordinate approximation for the user using the motion type characterization. In some aspects, encoding C-gait using the coordinate approximation may include receiving, via a vehicle vision system, an image frame associated with the approach vector, and determining, using the coordinate approximation, that the user is shown in the image frame at a location associated with the coordinate approximation.

In other aspects, receiving the C-gait signature can include determining that the passive key device is within a detection zone associated with the vehicle, sending a confirmation signal to the passive key device, and generating, responsive to receiving a confirmation message from the passive key device, a wakeup signal to initiate a vehicle vision system. This step may further include sending, to the passive key device, a request message for the key G-gait, and receiving, from the passive key device carried by the user, the key G-gait encoding indicative responsive to the request message.

At step 415, the method 400 may further include determining, within a threshold of error, that the C-gait signature is similar to the key G-gait signature. In other aspects, the method 400 may include generating a command for a status notification action indicative of an authentication status.

At step 420, the method 400 may further include authenticating the vehicle access signal responsive to determining that the C-gait signature is similar to the key G-gait signature. In this case, the method may further include actuating a vehicle horn, and/or actuating a vehicle light. Additionally, or alternatively, this step may further include sending, to the passive key device, a command for the status notification action. The command for the status notification action may configure the passive key device for generating a notification indicative that the vehicle access signal is not authenticated. Responsive to authenticating the vehicle access signal, this step may further include registering a door handle touch, and the vehicle control unit 165 (See FIG. 1) sending a door unlock command to a lock actuator associated with a vehicle door responsive to registering the door handle touch.

In other aspects, the method may include a step for determining that the C-gait signature has deviated from the G-gait signature, although they were once identical at an earlier time during the analysis. Responsive to authenticating the vehicle access signal, this step may further include monitoring the deviation between C-gait and G-gait signatures. Placing the vehicle in a lock mode responsive to determining that the C-gait signature has significantly deviated from the G-gait signature.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for authenticating a vehicle access signal using two independent signal verifications, the method comprising:
    receiving, from a passive key device carried by a user, a passive key device (key G-gait) motion vector indicative of a gait of the user approaching a vehicle;
    determining, via a vehicle perception system onboard the vehicle, a vehicle perception gait (C-gait) motion vector;
    determining that an inferred distance between the C-gait vector and key G-gait vector is within an acceptable threshold indicative of a similarity match between the C-gait vector and key G-gait vector, which were independently acquired; and
    authenticating the vehicle access signal responsive to determining that the C-gait vector matches the key G-gait vector.

2. The method according to claim 1, further comprising:
    generating a command for a status notification action indicative of an authentication status.

3. The method according to claim 2, wherein generating the command for the status notification action comprises at least one of:
    sending an alert to the passive key device;
    actuating a vehicle horn; and
    actuating a vehicle light.

4. The method according to claim 2, wherein generating the command for the status notification action comprises:
    sending, to the passive key device, a command for the status notification action, wherein the command for the status notification action configures the passive key device for generating a notification indicative that the vehicle access signal is not authenticated.

5. The method according to claim 1, wherein determining the C-gait motion vector comprises:
    measuring, via the vehicle perception system, an approach vector of the user;
    determining, based on the approach vector, the C-gait motion vector, a receipt time for the C-gait motion vector, and a position approximation for the user relative to the vehicle perception system; and
    encoding the C-gait motion vector using the position approximation.

6. The method according to claim 5, wherein determining a coordinate approximation for the user comprises:
    characterizing a motion type associated with the user approaching the vehicle; and
    determining the coordinate approximation for the user using the motion type.

7. The method according to claim 6, wherein measuring the C-gait motion vector based on the position approximation comprises:
    receiving, via a vehicle vision system, an image frame associated with the approach vector; and
    determining, using the position approximation, that the user is visible in the image frame at a location associated with the coordinate approximation.

8. The method according to claim 7, wherein the vehicle vision system comprises an optical camera.

9. The method according to claim 7, wherein the vehicle vision system comprises a thermal vision camera.

10. The method according to claim 1, wherein receiving the key G-gait motion vector comprises:
    determining that the passive key device is within a detection zone associated with the vehicle;
    sending a confirmation signal to the passive key device;

generating, responsive to receiving a confirmation message from the passive key device, a wakeup signal to initiate a vehicle vision system;

sending, to the passive key device, a request message for the key G-gait motion vector; and receiving, from the passive key device carried by the user, the key G-gait motion vector responsive to the request message.

11. The method according to claim 1, further comprising:

responsive to authenticating the vehicle access signal, registering a door handle touch or a walk-up unlock trigger; and sending a door unlock command to a lock actuator associated with a vehicle door responsive to registering the door handle touch or walk-up unlock trigger.

12. The method according to claim 1, further comprising:

responsive to authenticating the vehicle access signal, determining that the C-gait motion vector is not identical to the key G-gait motion vector; and placing the vehicle in a lock mode responsive to determining that the C-gait motion vector does not match the key G-gait motion vector.

13. A system, comprising:

a processor; and a memory for storing executable instructions, the processor programmed to execute the instructions to:
  receive, from a passive key device carried by a user, a passive key device (key G-gait) signature indicative of a gait of the user approaching a vehicle;
  determine, via a vehicle perception system onboard the vehicle, a vehicle perception gait (C-gait) signature;
  determine that the C-gait signature is within an acceptable similarity measure range to the key G-gait signature; and
  authenticate a vehicle access signal responsive to determining that the C-gait signature is within the acceptable similarity measure range to the key G-gait signature.

14. The system according to claim 13, wherein the processor is further programmed to:

determine that the C-gait signature is outside an acceptable similarity measure range to the key G-gait signature; and generate a command for a status notification action indicative of a failed authentication status.

15. The system according to claim 14, wherein the processor is further programmed to generate the command for the status notification action by executing the instructions to:

send an alert to the passive key device;

actuate a vehicle horn; and actuate a vehicle light.

16. The system according to claim 14, wherein the processor is further programmed to generate the command for the status notification action by executing the instructions to:

send, to the passive key device, the command for the status notification action, wherein the command for the status notification action configures the passive key device for generating a notification.

17. The system according to claim 13, wherein the processor is further programmed to determine the C-gait signature by executing the instructions to:

measure, via the vehicle perception system, an approach vector of the user;

determine, using the approach vector, the C-gait signature, a receipt time for the C-gait signature, a position approximation for the user relative to the vehicle perception system; and encode the C-gait signature using the position approximation.

18. The system according to claim 17, wherein the processor is further programmed to determine the position approximation for the user by executing the instructions to:

characterize a motion type associated with the user approaching the vehicle; and determine the position approximation for the user using the motion type.

19. The system according to claim 17, wherein the processor is further programmed to measure the C-gait signature using the position approximation by executing the instructions to:

receive, via a vehicle vision system, an image frame associated with the approach vector; and determine, using the position approximation, that the user is visible in the image frame at a location associated with a coordinate approximation.

20. A non-transitory computer-readable storage medium in a vehicle controller, the computer-readable storage medium having instructions stored thereupon which, when executed by a processor, cause the processor to perform steps that authorize a vehicle access signal using two independent signal verifications:

receive, from a passive key device carried by a user, a passive key device (key G-gait) signature indicative of a gait of the user approaching a vehicle;

determine, via a vehicle perception system onboard the vehicle, a vehicle perception gait (C-gait) signature;

determine that the C-gait signature is similar, within an acceptable similarity measure threshold, to the G-gait signature; and authenticate the vehicle access signal responsive to determining that C-gait signature is similar, within the acceptable similarity measure threshold, to the key G-gait signature.

\* \* \* \* \*